United States Patent
Zhong et al.

(10) Patent No.: US 10,260,407 B2
(45) Date of Patent: Apr. 16, 2019

(54) GAS QUALITY VIRTUAL SENSOR FOR AN INTERNAL COMBUSTION ENGINE

(71) Applicant: Cummins Inc., Columbus, IN (US)

(72) Inventors: Jinghua Zhong, Bloomington, IN (US); C. Larry Bruner, Greewood, IN (US); Timothy P. Lutz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/415,132

(22) Filed: Jan. 25, 2017

(65) Prior Publication Data

US 2017/0218837 A1    Aug. 3, 2017

Related U.S. Application Data

(60) Provisional application No. 62/290,516, filed on Feb. 3, 2016.

(51) Int. Cl.
| | |
|---|---|
| *F02M 1/00* | (2006.01) |
| *F02M 7/00* | (2006.01) |
| *F02B 43/12* | (2006.01) |
| *F02D 19/02* | (2006.01) |
| *F02D 41/14* | (2006.01) |
| *F02D 41/18* | (2006.01) |
| *F02D 19/06* | (2006.01) |
| *F02D 41/00* | (2006.01) |
| *F02M 26/05* | (2016.01) |
| *F02M 26/06* | (2016.01) |

(Continued)

(52) U.S. Cl.
CPC ............ *F02B 43/12* (2013.01); *F02D 19/027* (2013.01); *F02D 19/029* (2013.01); *F02D 19/0628* (2013.01); *F02D 19/0636* (2013.01); *F02D 19/0647* (2013.01); *F02D 41/0027* (2013.01); *F02D 41/1456* (2013.01); *F02D 41/182* (2013.01); *F02D 41/0025* (2013.01); *F02D 2200/0611* (2013.01); *F02D 2200/0612* (2013.01); *F02D 2200/0614* (2013.01); *F02M 26/05* (2016.02); *F02M 26/06* (2016.02); *F02M 26/24* (2016.02); *F02M 26/25* (2016.02); *Y02T 10/32* (2013.01)

(58) Field of Classification Search
CPC ............... F02D 19/081; F02D 41/0025; F02D 41/2445; F02D 41/2451; F02B 19/1052
USPC .................. 123/434, 672, 674; 701/103–105
See application file for complete search history.

(56) References Cited

U.S. PATENT DOCUMENTS

| | | | |
|---|---|---|---|
| 5,081,969 A * | 1/1992 | Long, III ............ | F02B 19/1028 123/274 |
| 6,061,637 A | 5/2000 | Sorge et al. | |

(Continued)

FOREIGN PATENT DOCUMENTS

| | | |
|---|---|---|
| EP | 3075996 | 10/2016 |
| WO | 2007020456 | 2/2007 |
| WO | 201603002 | 3/2016 |

*Primary Examiner* — John Kwon
(74) *Attorney, Agent, or Firm* — Taft Stettinius & Hollister LLP

(57) ABSTRACT

Systems, methods and apparatus for controlling operation of an engine structured to combust gaseous fuel such as a dual fuel engine, including an estimation of key parameters dependent on natural gas quality, are disclosed. The natural gas quality parameters are estimated from natural gas properties obtained from various sensed parameters associated with the engine.

14 Claims, 5 Drawing Sheets

(51) Int. Cl.
    *F02M 26/25*     (2016.01)
    *F02M 26/24*     (2016.01)

(56)         References Cited

U.S. PATENT DOCUMENTS

| | | | |
|---|---|---|---|
| 6,151,547 A * | 11/2000 | Kumar | G01M 15/102 |
| | | | 60/274 |
| 7,383,816 B2 | 6/2008 | Zurlo | |
| 7,913,675 B2 * | 3/2011 | Bailey | F02B 19/12 |
| | | | 123/568.21 |
| 8,478,506 B2 | 7/2013 | Grichnik et al. | |
| 9,249,737 B2 | 2/2016 | Fitzgerald et al. | |
| 2011/0010318 A1 | 1/2011 | Roverso | |
| 2015/0300273 A1 | 10/2015 | Hunter | |
| 2016/0208749 A1 | 7/2016 | Sivasubramanian et al. | |
| 2016/0258379 A1 | 9/2016 | Rasmussen et al. | |

\* cited by examiner

GAS QUALITY VIRTUAL SENSOR FOR AN INTERNAL COMBUSTION ENGINE

TECHNICAL FIELD

The present disclosure relates generally to a gas quality virtual sensor for an internal combustion engine, and more particularly but not exclusively to systems and methods for virtually sensing one or more qualities of wellhead natural gas.

BACKGROUND

An example internal combustion engine is a dual fuel engine that includes a first type of fuel that may be utilized as the sole fuel during certain operating conditions and a second type of fuel that may be utilized in varying proportions in combination with the first type of fuel during other operating conditions. In certain applications, the first fuel source is a diesel fuel and the second fuel source is natural gas. The substitution of natural gas for diesel fuel can reduce the costs of operating the engine, particularly when the engine is employed at locations where natural gas is abundant or available at low cost. For example, in pressure pumping applications such as fracking rigs and equipment, dual-fuel engines may combust wellhead natural gas which is often unprocessed or minimally processed. Wellhead natural gas may have a wide range of quality characteristics derived from a varying combustible mixture of hydrocarbon gases including varying proportions of methane, ethane, propane, butane and/or pentane. Existing efforts to provide controls for dual fuel engines suffer from a number of drawbacks, limitations and shortcomings. There remains a significant need for the unique apparatuses, methods, systems and techniques disclosed herein.

SUMMARY

Unique systems, methods and apparatus for controlling operation of dual fuel engines, including an estimation of one or more parameters relating to natural gas quality are disclosed. In one embodiment, natural gas quality parameters are estimated from natural gas properties derived from various sensed parameters of the dual fuel engine.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
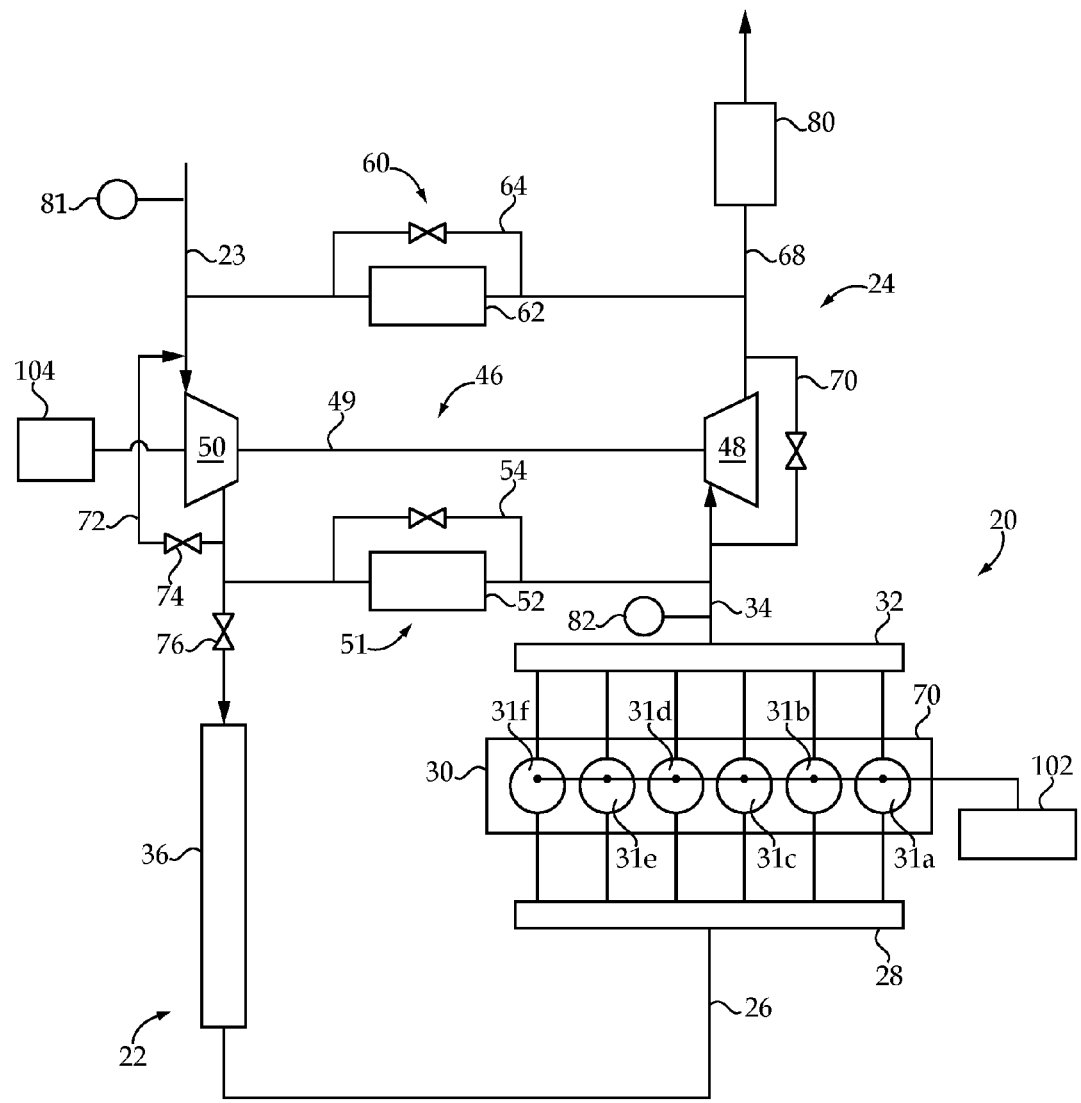
FIGS. 1 and 2 are schematic illustrations of certain aspects of an exemplary dual fuel engine and fueling system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
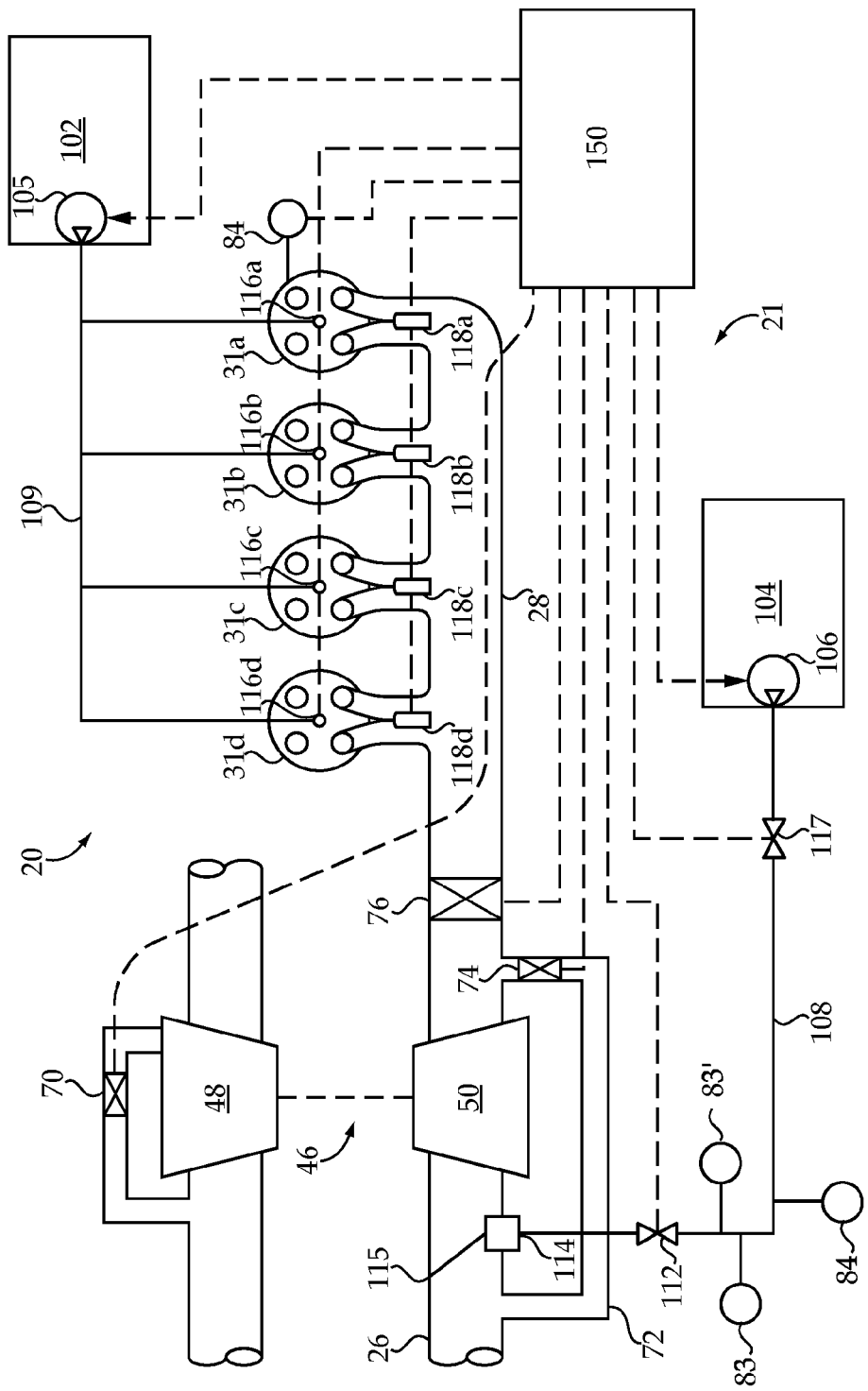

With reference to FIGS. 1 and 2, an internal combustion engine system 20 is illustrated in schematic form. A fueling system 21 (FIG. 2) is also shown in schematic form that is operable with internal combustion engine system 20 to provide fueling for a dual fuel engine 30 from a first fuel source 102 and a second fuel source 104. Internal combustion engine system 20 includes dual fuel engine 30 connected with an intake system 22 for providing a charge flow to engine 30 and an exhaust system 24 for output of exhaust gases. In certain embodiments, the dual fuel engine 30 includes a lean combustion engine such as a diesel cycle engine that uses a primary or first fuel that is a liquid fuel such as diesel fuel and a secondary or second fuel that is a gaseous fuel such as natural gas. The second fuel can be, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of first and second fuels are not precluded, such as any suitable liquid fuel and gaseous fuel. In certain embodiments, the first fuel is a fuel suitable for lean burning, and the second fuel is a fuel that utilizes stoichiometric or near-stoichiometric combustion except when combined with the first fuel during a dual fueling operation. In the illustrated embodiment, the dual fuel engine 30 includes six cylinders 31*a*-31*f* in an in-line arrangement. However, the number of cylinders (collectively referred to as cylinders 31) may be any number, and the arrangement of cylinders 31 may be any arrangement, and is not limited to the number and arrangement shown in FIG. 1.

Dual fuel engine 30 includes an engine block 70 that at least partially defines the cylinders 31*a*, 31*b*, 31*c*, 31*d*, 31*e*, 31*f* (collectively referred to as cylinders 31.) A plurality of pistons (not shown) may be slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, dual fuel engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The dual fuel engine 30 includes cylinders 31 connected to the intake system 22 to receive a charge flow and connected to exhaust system 24 to release exhaust gases produced by combustion of the first and/or second fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion of the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine with a size-controllable inlet opening. In other embodiments, the exhaust valve is an exhaust throttle and/or wastegate. While specific examples have been discussed, no particular form of intake or exhaust control valving is required, nor is the use of the same precluded.

An aftertreatment system 80 can be connected with an outlet conduit 68. The aftertreatment system 80 may include, for example, oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbocharger, variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Only four cylinders 31a, 31b, 31c, 31d are shown in FIG. 2, it being understood that if additional cylinders, such as cylinders 31e and 31f, or fewer cylinders, are provided they are arranged in a manner similar to the illustrated cylinders 31. Fuel system 21 includes first fuel source 102 and second fuel source 104. First fuel source 102 is configured to provide a flow of a first fuel to cylinders 31 with one or more injectors at or near each cylinder. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, at least one of a port injector at each cylinder or a mixer at an inlet of compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 150 is configured to control the flow of liquid diesel fuel from first source 102 and the flow of gaseous fuel from second source 104 in accordance with, for example, engine speed, engine loads, intake manifold pressures, and fuel pressures, as discussed further below.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116a-116d, respectively. The direct injectors 116a-116d may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31a, 31b, 31c, 31d may include one or more port injectors 118a, 118b, 118c, 118d, respectively. In one embodiment, the port injectors 118a-118d may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104.

In certain embodiments, each cylinder 31 includes at least one direct injector that is capable of providing all of the designed fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

One embodiment of system 20 includes fuel system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to controller 150, and the second fuel source 104 includes, in one embodiment, a second fuel pump 106 that is connected to controller 150. Each of the cylinders 31 includes an injector, such as direct injectors 116a-116d associated with each of the illustrated cylinders 31a-31d of FIG. 2. Direct injectors 116a-116d are electrically connected with controller 150 to receive fueling commands that provide a fuel flow to the respective cylinder 31 in accordance with a fuel command determined according to engine operating conditions and operator demand by reference to fueling maps, control algorithms, or other fueling rate/amount determination source stored in controller 150. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by controller 150 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fuel system 21 that is connected to controller 150. Second fuel pump 106 is operable to provide a second fuel flow from second fuel source 104 in an amount determined by controller 150 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

Controller 150 can be connected to actuators, switches, or other devices associated with fuel pumps 105, 106, shutoff valve 112, intake throttle 76, compressor bypass valve 74, shutoff valve 112, flow control valve 117, wastegate 70 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake throttle 76, compressor bypass valve 74, wastegate 70, injectors 116, 118 and/or the on/off status of fuel pumps 105, 106 can be controlled via control commands from controller 150.

In other embodiments, a first subset of cylinders 31 is associated with a first cylinder bank (not shown) and a second subset of cylinders 31 is associated with a second cylinder bank. Accordingly, differing substitution rates of the gaseous fuel can be used for the cylinder banks. In certain embodiments of engines with multiple cylinder banks, the feed lines for the gaseous fuel can be separately controlled to each cylinder bank to provide the desired substitution rate of the gaseous fuel for the respective cylinder bank.

In certain embodiments of the systems disclosed herein, controller 150 is structured to perform certain operations to control engine operations and fueling of cylinders 31 with fueling system 21 to provide the desired operational outcomes. In certain embodiments, the controller 150 forms a portion of a processing subsystem including one or more computing devices having memory, processing, and communication hardware. The controller 150 may be a single device or a distributed device, and the functions of the controller 150 may be performed by hardware or instructions provided on a computer readable storage medium. The controller 150 may be included within, partially included within, or completely separated from an engine controller (not shown). The controller 150 may be in communication with any sensor or actuator throughout the systems disclosed herein, including through direct communication, communication over a datalink, and/or through communication with other controllers or portions of the processing subsystem that provide sensor and/or actuator information to the controller 150.

A number of sensors associated with systems 20 and/or 21 may be structured in operative communication with the controller 150. Unless indicated otherwise, the sensors disclosed herein may comprise physical sensors, virtual sensors, and/or combinations thereof. In certain embodiments, the controller 150 may be in operative communication with an intake fresh air mass flow sensor 81 (sometimes referred to as an intake air flow sensor) structured to measure or estimate intake fresh air mass flow, an exhaust $O_2$ sensor 82 (sometimes referred to as an exhaust lambda sensor) structured to measure or estimate exhaust oxygen or related characteristics, and a gaseous fuel mass flow sensor 83 (sometimes referred to as a gas mass flow sensor) structured to measure mass flow of the gaseous fuel provided for combustion. The exhaust $O_2$ sensor may also be provided and utilized in connection an exhaust back pressure sensor. The gaseous fuel mass flow sensor 83 may comprise a hot-film gas mass flow sensor or an orifice-type sensor. The orifice-type sensor may include inlet pressure, temperature, and delta-pressure or outlet pressure sensor components. Either a high-precision gas control valve or a dedicated orifice may be utilized in connection with the orifice-type sensor. Multiple gas mass flow sensor may be present in certain embodiments, for example, gas mass flow sensor 83 may be an orifice-type sensor and a hot film gas mass flow sensor 83' may also be utilized. In certain embodiments, the controller 150 may be in operative communication with a sensor 84 which may be a thermal conductivity sensor structured to measure thermal conductivity characteristics of gaseous fuel. In certain embodiments sensor 84 may alternatively be a speed of sound sensor structured to measure speed of sound in the gaseous fuel. In certain embodiments, the controller 150 may be in operative communication with a methane fraction sensor structured to measure methane fraction characteristics of gaseous fuel. While each of sensors 81, 82, 83, 83' and 84 may be present in certain embodiments, it shall be appreciated that other embodiments omit one or more of said sensors, for example, in cases where the information provided by a particular sensor is not needed for the control methods and systems disclosed herein.

Example and non-limiting implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of dual fuel internal combustion engines, improvements in engine torque generation and torque control, engine fuel economy performance, improvements in engine noise and vibration control for dual fuel engines, improvements in performance or operation of aftertreatment systems and/or components of dual fuel engines, and/or improvements in emissions reduction in dual fuel engines. Without limitation, example and non-limiting technological fields that are improved include the technological fields of dual fuel internal combustion engines and related apparatuses and systems as well as vehicles including the same.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The schematic flow descriptions which follow provide illustrative embodiments of methods for controlling fuelling during a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions. However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer or controller apparatus embodiment of controller 150 executing a computer program product on a non-transient computer readable storage medium, where the computer program product comprises instructions causing the computer to execute one or more of the operations, or to issue commands to other devices to execute one or more of the operations.

Figure 3:
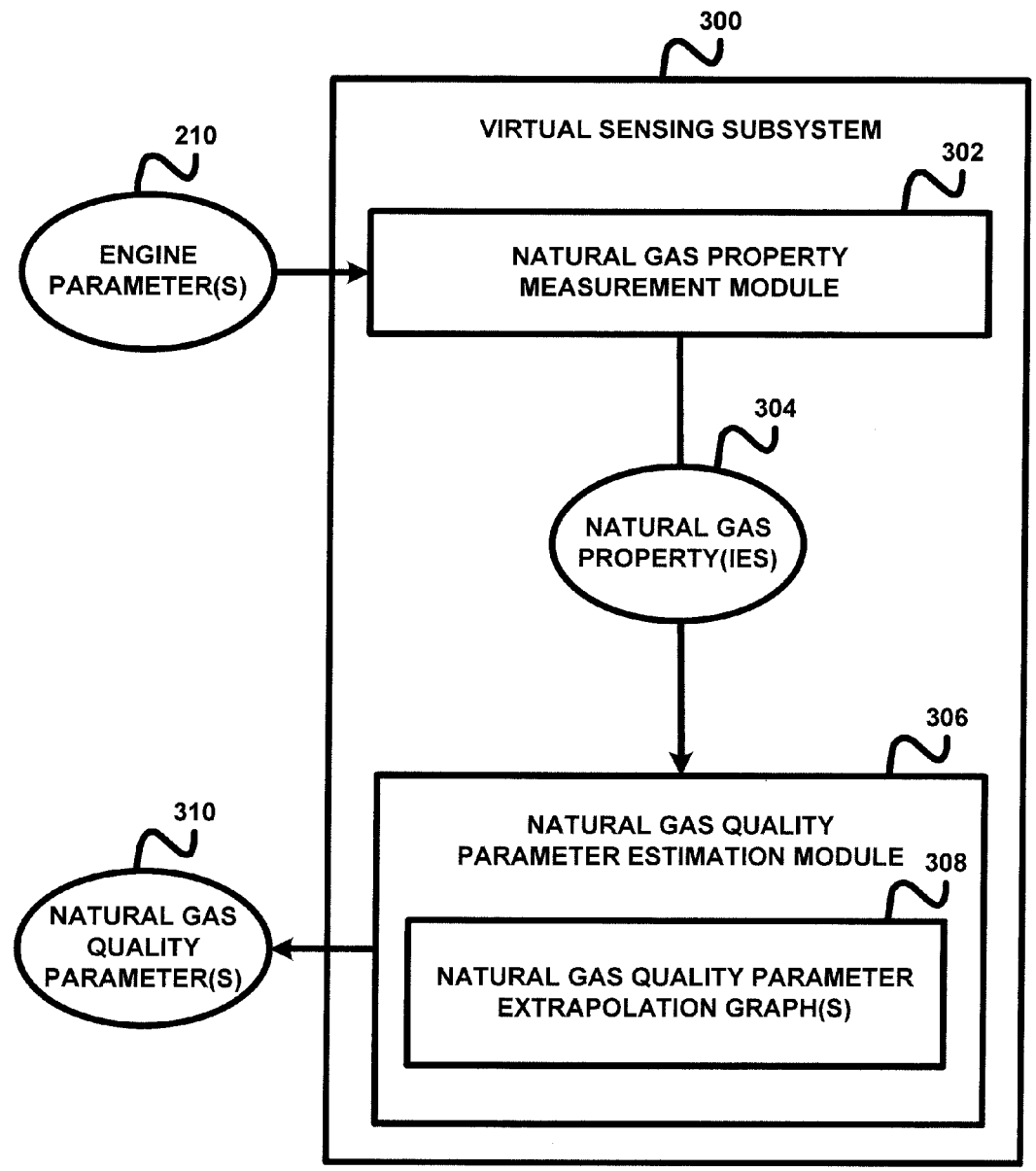
FIG. 3 is a schematic of a control apparatus for a dual fuel internal combustion engine.

FIG. 3 is a schematic illustration of an embodiment processing subsystem 300 of controller 150 that determines one or more natural gas quality parameters 310. Gas quality parameters 310 may include, for example, one or more of a parameter G (sometimes referred to as lambda parameter G), a gas specific gravity associated with a gaseous fuel, a methane number associated with a gaseous fuel, a lower heating value (LHV) associated with a gaseous fuel, and a Wobbe index associated with a gaseous fuel.

Controller 150 may utilize the parameter G in determining values for lambda which are utilized in controlling an internal combustion engine. The parameter G may be a significant potential source of control error at large lambda values encountered, for example, under lean burn conditions. In certain embodiments, controller 150 may include closed loop PI(D) controls that are structured to determine a target value for exhaust $O_2$ (or a related parameter, e.g., lambda or equivalence ratio), determine a current exhaust $O_2$ (or a related parameter, e.g., lambda or equivalence ratio) using a sensor which may be a physical sensor a virtual sensor or a combination thereof, determine an error between the target value and the current value, and process the error using proportional, integral and/or derivative control elements in conjunction with a feedback loop. In other embodiments, controller 150 may utilize an open loop controller, or other types of controllers.

Controller 150 may determine a target value for lambda by performing a calculation in accordance with equation (1) below:

$$\lambda = \frac{1 + Gx_{O_2}}{1 - Ax_{O_2}} \quad (1)$$

Parameter G may be theoretically defined in terms of a hydrogen to carbon ratio and an inert matter to carbon ratio, for example, as described by equation (2) below:

$$G = \frac{\frac{H}{C} + 4\frac{\text{Inert}}{C}}{\frac{H}{C} + 4} \quad (2)$$

In practice, explicit calculation of parameter G may not be possible or practical as the H:C ratio and Inert:C ratio may be unknown and difficult to determine or estimate. Even where determination or estimation is attempted, explicit calculation of parameter G from these ratios or adds computational burden and introduces sources of error.

In certain embodiments, subsystem 300 may be structured to directly determine or estimate parameter G without performing intermediate acts, calculations of operations such as determining the H:C ratio and Inert:C ratio. In an exemplary form, subsystem 300 may determine a stoichiometric fuel-to-air ratio (SFAR), for example, as described in connection with equation (4) below, and directly determine parameter G from SFAR without requiring intermediate calculations or process steps. The determination may be made based upon a predetermined relationship between parameter G and SFAR, for example, the linear relationship illustrated in FIG. 4A. Subsystem 300 may be structured to directly determine parameter G using a predetermined relationship between parameter G and SFAR in a number of manners, for example, by using a lookup table structure storing values representing the predetermined relationship, using an array, graph or other data structure to store values representing the predetermine relationship, or by performing a calculation based on a formula representing or approximating the predetermined relationship.

Parameter $x_{O_2}$ is an exhaust oxygen value which may be determined by controller 150 using input received from an exhaust $O_2$ sensor. Parameter A (sometimes referred to as lambda parameter A) may be determined based upon the ratio of $N_2$ to $O_2$ in the intake charge provided to the engine (which may be set to a nominal atmospheric value and, in some forms, may be adjusted based upon indications of altitude or ambient conditions) and the ratio of $H_2O$ to $O_2$ in the intake charge provided to the engine (which may be determined or estimated based upon inputs received from a humidity sensor). In certain embodiments, controller 150 may be structured to determine parameter A in accordance with equation (3) below:

$$A = 1 + \frac{N_2}{O_2} + \frac{H_2O}{O_2} \quad (3)$$

In certain embodiments, subsystem 300 may determine a methane number which can be utilized by controller 150 in controlling or preventing engine knock by controlling fueling, EGR, and/or air handling parameters. In an exemplary form, subsystem 300 may determine a flow sensor ratio (FSR), for example, as described in connection with equation (5) below, determine one of a thermal conductivity value (TC) such as from the output of a thermal conductivity sensor structured to measure thermal conductivity characteristics of gaseous fuel and a speed of sound (SOS) value such as from the output of a speed of sound sensor structured to measure speed of sound in the gaseous fuel, and determine the methane number from these values. Where input is received from a thermal conductivity sensor, the determination may be made directly based upon a predetermined relationship between the methane number and the product of TC and FSR (TC*FSR), for example, the linear relationship illustrated in FIG. 4C. Where input is received from a speed of sound sensor, the determination may be made directly based upon a predetermined relationship between the methane number and the product of SOS and FSR (SOS*FSR) which may be a linear relationship similar to the linear relationship illustrated in FIG. 4B for the thermal conductivity sensor. Subsystem 300 may be structured to directly determine a methane number using such a predetermined relationship in a number of manners, for example, by using a lookup table structure storing values representing the predetermined relationship, using an array, graph or other data structure to store values representing the predetermine relationship, or by performing a calculation based on a formula representing or approximating the predetermined relationship.

In certain embodiments subsystem 300 may determine a gas specific gravity parameter which can be utilized by controller 150 in controlling operation of the engine. Controller 150 may utilize the gas specific gravity parameter in calculating a fresh air flow from charge flow and gas mass flow (e.g., by determining how much fresh air is displaced by the gas mass flow) and may control fueling, EGR and/or air handling decisions based on the same. In an exemplary form, subsystem 300 may determine a flow sensor ratio (FSR), for example, as described in connection with equation (5) below, determine one of a thermal conductivity value (TC) such as from the output of a thermal conductivity sensor structured to measure thermal conductivity characteristics of gaseous fuel and a speed of sound (SOS) value such as from the output of a speed of sound sensor structured to measure speed of sound in the gaseous fuel, and determine the methane number from these values. Where input is received from a thermal conductivity sensor, the determination may be made directly based upon a predetermined relationship between the specific gravity and the inverse of the product of TC and FSR (1/(TC*FSR)), for example, the linear relationship illustrated in FIG. 4B. Where input is received from a speed of sound sensor, the determination may be made directly based upon a predetermined relationship between the specific gravity and the inverse of the product of SOS and FSR (1/(SOS*FSR)), which may be a linear relationship similar to the linear relationship illustrated in FIG. 4B for the thermal conductivity sensor. Subsystem 300 may be structured to directly determine a specific gravity using such a predetermined relationship in a number of manners, for example, by using a lookup table structure storing values representing the predetermined relationship, using an array, graph or other data structure to store values representing the predetermine relationship, or by performing a calculation based on a formula representing or approximating the predetermined relationship.

In certain embodiments, subsystem 300 may determine and utilize a lower heating value (LHV) for fuel quality monitoring and may control fueling, EGR and/or air handling decisions based on the same. In an exemplary form, subsystem 300 may determine a stoichiometric fuel-to-air ratio (SFAR), for example, as described in connection with equation (4) below, determine one of a thermal conductivity value (TC) such as from the output of a thermal conductivity sensor structured to measure thermal conductivity characteristics of gaseous fuel and a speed of sound (SOS) value such as from the output of a speed of sound sensor structured to measure speed of sound in the gaseous fuel, and determine the LHV from these values. Where input is received from a thermal conductivity sensor, the determination may be made directly based upon a predetermined relationship between LHV and the inverse of the product of TC and SFAR (1/(TC*SFAR)), for example, the linear relationship illustrated in FIG. 4D. Where input is received from a speed of sound sensor, the determination may be made directly based upon a predetermined relationship between LHV and the inverse of the product of SOS and SFAR (1/(SOS*SFAR)) which may be similar to the linear relationship illustrated in FIG. 4D for the thermal conductivity sensor. Where input is received from a thermal conductivity sensor, the determination may be alternatively be made directly based upon a predetermined relationship between LHV and the quotient of TC and SFAR (TC/SFAR), for example, the linear relationship illustrated in FIG. 4F. Where input is received from a speed of sound sensor, the determination may be made directly based upon a predetermined relationship between LHV and the quotient of SOS and SFAR (SOS/SFAR) which may be similar to the linear relationship illustrated in FIG. 4F for the thermal conductivity sensor. Subsystem 300 may be structured to directly determine a methane number using such a predetermined relationship in a number of manners, for example, by using a lookup table structure storing values representing the predetermined relationship, using an array, graph or other data structure to store values representing the predetermine relationship, or by performing a calculation based on a formula representing or approximating the predetermined relationship.

In certain embodiments subsystem 300 may determine and utilize a Wobbe index for fuel quality monitoring and may control fueling, EGR and/or air handling decisions based on the same. In an exemplary form, subsystem 300 may determine a stoichiometric fuel-to-air ratio (SFAR), for example, as described in connection with equation (4) below, and determine the Wobbe index from SFAR. The determination may be made directly based upon a predetermined relationship between the Wobbe index and SFAR, for example, the linear relationship illustrated in FIG. 4E. Subsystem 300 may be structured to directly determine parameter G using a predetermined relationship between parameter G and SFAR in a number of manners, for example, by using a lookup table structure storing values representing the predetermined relationship, using an array, graph or other data structure to store values representing the predetermine relationship, or by performing a calculation based on a formula representing or approximating the predetermined relationship.

In certain embodiments controller 150 may determine multiple gas quality parameters such as those discussed above. In certain forms, two or more of a lambda parameter G, a gas specific gravity, a methane number, a lower hearing value (LHV), and a Wobbe index may be determined and utilized in controlling operation of the engine as described herein. In certain forms, three or more of a lambda parameter G, a gas specific gravity, a methane number, a lower hearing value (LHV), and a Wobbe index may be determined and utilized in controlling operation of the engine as described herein. In certain forms, four or more of a lambda parameter G, a gas specific gravity, a methane number, a lower hearing value (LHV), and a Wobbe index may be determined and utilized in controlling operation of the engine as described herein. In certain forms, all of lambda parameter G, a gas specific gravity, a methane number, a lower hearing value (LHV), and a Wobbe index may be determined and utilized in controlling operation of the engine as described herein.

Processing subsystem 300 includes a natural gas property measurement module 302 that is structured to receive engine parameter inputs from a plurality of sensors associated with dual fuel engine 30 and/or systems 20 and 21 and to determine one or more natural gas properties 304 using the sensor inputs. The sensor inputs may comprise inputs from one or more of the sensors described herein. It shall be understood that the terms sensor input and sensor inputs refer to inputs to processing subsystem 300 received from one or more sensors and may alternatively be referred to as received sensor outputs. In certain embodiments, the sensor inputs comprise an input from a charge flow or air flow sensor structured to measure or estimate charge flow or air flow and an input from a gas mass flow sensor structured to measure characteristics of the gaseous fuel provided for combustion. As described above the gas mass flow sensor may comprise a hot-film gas mass flow sensor, and/or an orifice integrated with inlet pressure, temperature, and delta-pressure or outlet pressure sensor components. The sensor inputs may further comprises inputs from a thermal conductivity sensor and a methane fraction sensor. In certain embodiments, the sensor inputs comprise inputs from a charge air flow sensor, an exhaust $O_2$ sensor and an exhaust back pressure sensor, an orifice gas mass flow sensor, a hot film mass flow sensor, a thermal conductivity sensor, and a methane fraction sensor.

Natural gas property measurement module 302 is structured to determine one or more natural gas properties 304 using the received sensor inputs. The natural gas properties 304 may include a stoichiometric fuel-to-air ratio (SFAR) and a flow sensor ratio (FSR). Module 302 may be structured to determine a SFAR value by receiving inputs from a gas mass flow sensor, a fresh air flow sensor and an exhaust $O_2$ or lambda sensor, and performing a calculation in accordance with equation (4) below:

$$\text{SFAR} = (\text{gas mass flow sensor input/fresh air mass flow sensor input})*(\text{exhaust } O_2 \text{ or lambda sensor input}) \quad (4)$$

The gas mass flow sensor input may be provided by an orifice gas mass flow sensor or a hot film gas mass flow sensor, or a combination of these and/or other gas mass flow sensors.

Module 302 may be further structured to determine a FSR value by performing a calculation in accordance with equation (5) below:

$$\text{FSR} = (\text{orifice gas mass flow sensor input})/(\text{hot film gas mass flow sensor input}) \quad (5)$$

It shall be appreciated that FSR=1 for the a predetermined (e.g., nominal or ideal) gas for which both sensors are calibrated and that FSR changes with gas quality because different types of sensors (e.g., orifice type sensors and hot film type sensors) are based on different physical principles and are affected by different physical properties. For example, hot film-type sensors are affected by variation in thermal conductivity and viscosity while orifice-type sensors are affected by variation in density and ratio of specific heat. It shall be further appreciated that FSR may be determined as the ratio between two different types of sensors referred to generally as gas mass flow sensor 1 and gas mass flow sensor 2 where sensor 1 may be an orifice type sensor, a hot film sensor or another type of sensor, and sensor 2 may be a different one of an orifice type sensor, a hot film sensor or another type of sensor.

Subsystem 300 further includes a natural gas quality parameter estimation module 306 structured to output one or more natural gas quality parameters 310 for an operation and control of systems 20 and 31 by controller 150 in response to the natural gas properties 304. Natural gas quality parameters 310 may include, for example, one or more of a lambda (λ) parameter G, a gas specific gravity, a methane number, a lower heating value (LHV), and a Wobbe index. Module 306 may be structured to determine parameters 310 using one or more predetermined relationships between a natural gas quality parameter and a natural gas property such as those described above in connection with controller 150 generally. The predetermined relationships may be implemented in one or more lookup tables or one or more calculation algorithms. The predetermined relationships may be determined based upon empirically observed relationships, theory-based relationships or combinations thereof.

In certain embodiments, natural gas quality parameter estimation module 306 stores or has access to predetermined relationships based upon one or more empirical natural gas quality parameter extrapolation graphs 308 which provide a relationship between the natural gas quality parameter(s) 310 in response to the natural gas properties 304. The natural gas quality parameter extrapolation graphs 308 may provide relationships for a number of natural gas quality parameter(s).

Examples of empirically determined relationships between natural gas quality parameters 310 and natural gas properties 304 are illustrated in FIGS. 4A-4F. The data plots illustrated therein represent results for 10000 uniformly random gas compositions ($CO_2$, $N_2$, $CH_4$, $C_2H_6$, $C_3H_8$, $C_4H_{10}$). Actual field samples of gas composition ($CO_2$, $N_2$, $CH_4$, $C_2H_6$, $C_3H_8$, $C_4H_{10}$, $C_5H_{12}$, $C_6H_{14}$) may also be used. The gas compositions were tested under the assumption that the internal combustion engine system was configured to combust $CH_4$ at maximum rated power with a hot-film sensor voltage of 3.5. Using those conditions an empirically found mass flow that gives the same lambda for each gas was determined. Hot-film sensor flow and orifice sensor flow corresponding to the true mass flow for each gas were calculated. Gas quality parameters were fit to functions of physical or derived gas properties measured by sensor sets and find the best correlation.

Figure 4A:
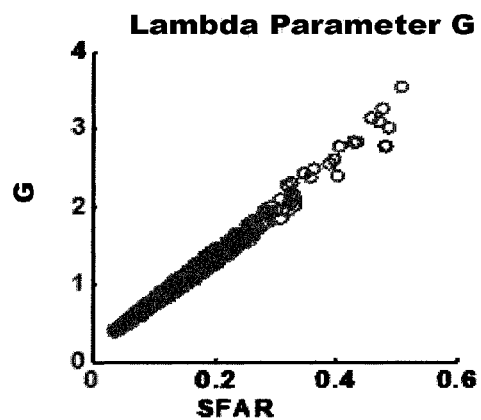
FIGS. 4A-4F are exemplary natural gas property-parameter graphs.

The graph of FIG. 4A illustrates a relationship between lambda parameter G and stoichiometric fuel-to-air ratio (SFAR). As shown in FIG. 4A, a linear relationship between lambda parameter G and SFAR may be determined, for example, using a regression technique to determine a best fit line. As noted above, this relationship may be implemented in module 304 using one or more lookup tables and/or calculation algorithms. In certain embodiments the relationship may be partially linear, linear over different intervals or ranges or non-linear and may be fit to a higher order polynomial and or exponential expression.

Figure 4B:
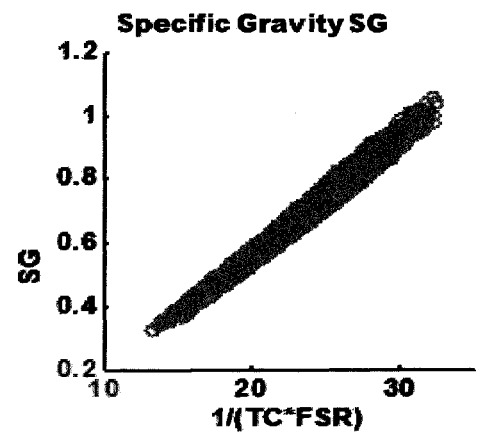
Figure 4C:
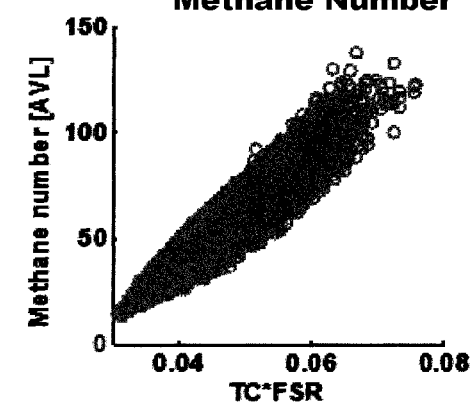
Figure 4D:
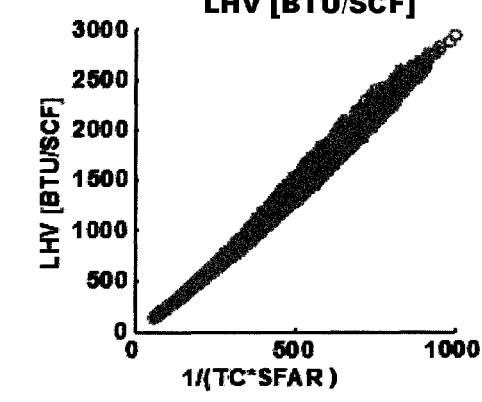
Figure 4E:
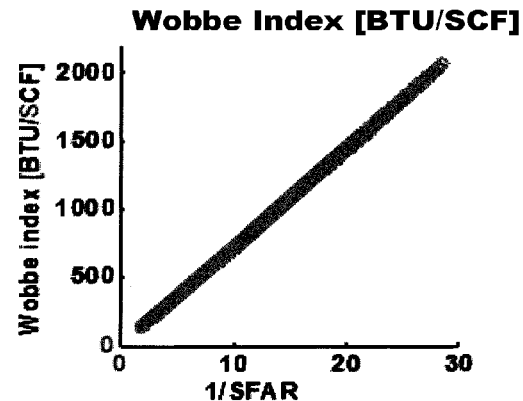
Figure 4F:
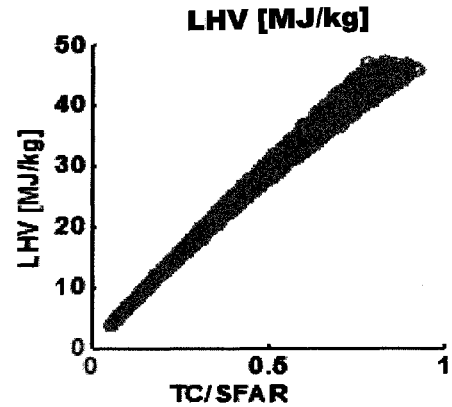

The graph of FIG. 4B illustrates a linear relationship between a gas specific gravity and the inverse of the product of thermal conductivity (TC) and flow sensor ratio (FSR) (1/(TC*FSR)). The graph of FIG. 4C illustrates a linear relationship between a methane number the product of TC and FSR (TC*FSR). The graph of FIG. 4D illustrates a linear relationship between lower heating value by standard volume (LHV) and the product of TC and SFAR from an orifice type sensor ($1/(TC*SFAR_{Orifice})$). The graph of FIG. 4E illustrates a linear relationship between a Wobbe index and the inverse of an SFAR from an orifice type sensor ($1/SFAR_{Orifice}$). The graph of FIG. 4F illustrates a linear relationship between lower heating value by mass (LHV) and the quotient of TC and SFAR from an orifice type sensor ($TC/SFAR_{Orifice}$). The foregoing relationship may be implemented in module 304 using one or more lookup tables and/or calculation algorithms. In certain embodiments the relationships may be partially linear or non-linear, linear over different intervals or ranges and may be fit to a higher order polynomial or exponential expression.

Figure 5:
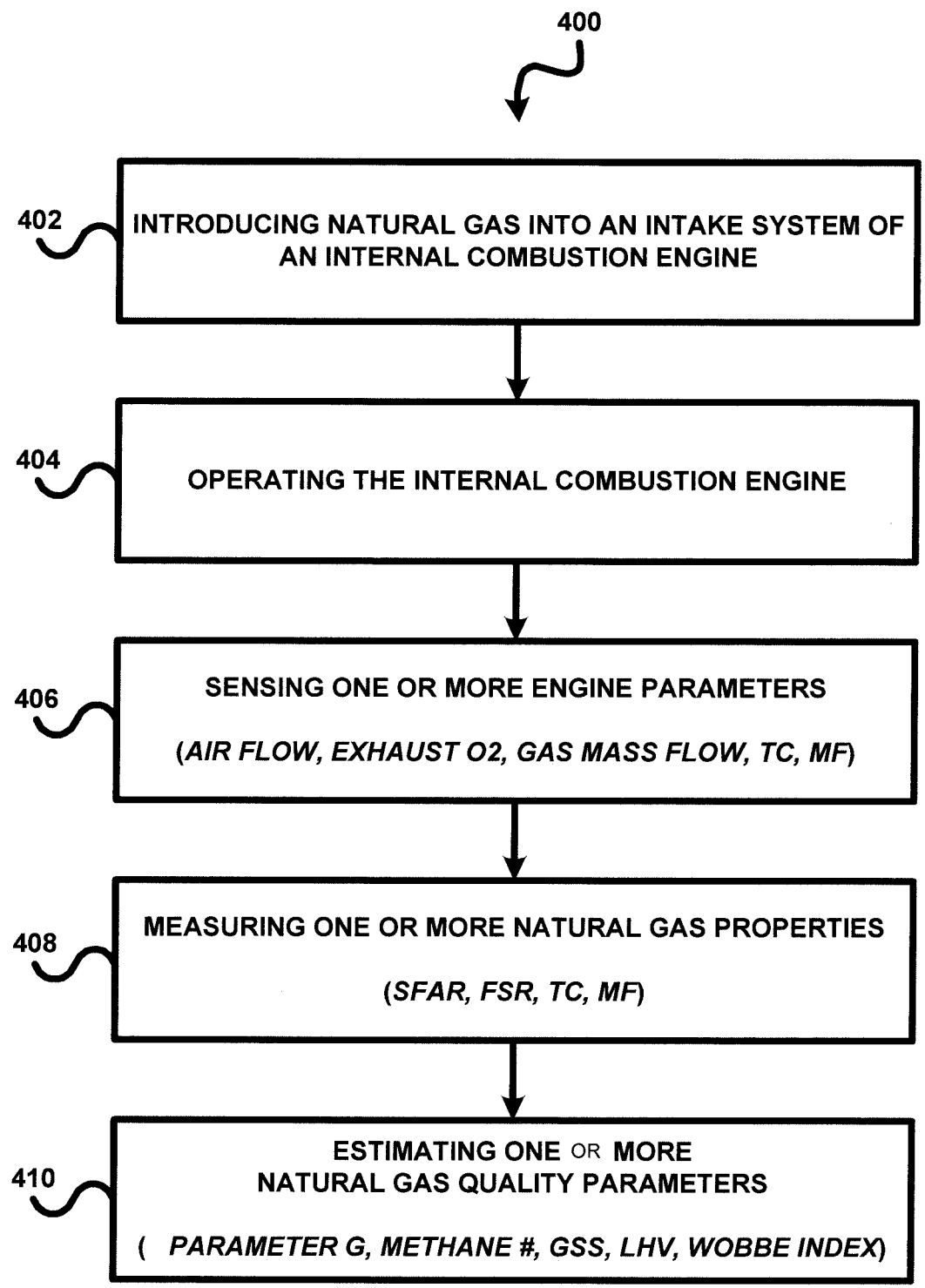
FIG. 5 is a flow diagram of a procedure for dual fuel operation of an internal combustion engine.

Referring to FIG. 5, there is shown another embodiment of a procedure 400 for estimates one or more natural gas quality parameter(s). In one embodiment, the procedure 400 is implemented by processing subsystem 300. Procedure 400 includes an operation 402 to introduce natural gas into an intake system 22 on internal combustion engine 30 for an operation 404 of operating internal combustion engine 30 from a mixture of the natural gas and diesel fuel as previously described herein. Procedure 400 continues at operation 406 to sense or more engine parameters by various sensors of internal combustion engine 30 including a virtual or physical charge/air flow sensor, a wide-band exhaust $O_2$ sensor incorporating a back pressure sensor, hot-film gas mass flow sensor and/or an Orifice gas mass flow sensor, a thermal conductivity sensor, and/or a methane fraction sensor.

Procedure 400 continues at operation 408 to measure one or more natural gas properties including a stoichiometric fuel-to-air ratio (SFAR) equal to (gas mass flow/fresh air flow)*(exhaust $O_2$ lambda), and/or a flow sensor ratio (FSR) equal to (gas mass flow sensor 1)/(gas mass flow sensor 2). Procedure 400 continues at operation 410 to estimate the natural gas quality parameter(s) in response to the measured natural gas properties. In one embodiment, a lambda parameter G is estimated from the extrapolation graph shown in FIG. 4A, a gas specific gravity is estimated from the relationship illustrated in the extrapolation graph shown in FIG. 4B, a methane number is estimated from the relationship illustrated in the extrapolation graph shown in FIG. 4C, a LHV [BUT/SCF] is estimated from the relationship illustrated in the extrapolation graph shown in FIG. 4D, a Wobbe index [BTU/SCF] is estimated from the relationship illustrated in the extrapolation graph shown in FIG. 4E and/or a LHV[MJ/kg] is estimated from the relationship illustrated in the extrapolation graph shown in FIG. 4F.

A number of further exemplary embodiments shall now be described. One exemplary embodiment is a first method comprising: operating an internal combustion engine to combust a gaseous fuel; receiving with a controller inputs from a plurality of sensors associated with the engine including inputs from a gaseous fuel mass flow sensor, an intake fresh air mass flow sensor, and an exhaust $O_2$ sensor; determining with the controller using the received inputs a stoichiometric fuel-to-air ratio (SFAR) value; determining with the controller directly from the SFAR value without intermediate determinations a lambda parameter G value indicative of gaseous fuel quality based on a predetermined relationship between the SFAR value and the lambda parameter G value; and controlling with the controller operation of the engine using the lambda parameter G value.

In certain forms of the first method the act of controlling with the controller operation of the engine using the lambda parameter G value comprises calculating a lambda control value (λ) using the lambda parameter G value and controlling operation of the engine using the lambda control value (λ). In certain forms of the first method the act of calculating the lambda control value (λ) comprises calculating a lambda parameter A based upon a ratio of $N_2$ to $O_2$ in the intake charge provided to the engine and a ratio $H_2O$ to $O_2$ in the intake charge provided to the engine of and calculating the lambda control value using the lambda parameter A. In certain forms of the first method the lambda parameter A is calculated in accordance with the equation: $A=1+(N_2/O_2)+(H_2O/O_2)$, and the lambda control value ($\lambda$) is determined in accordance with the equation: $\lambda=(1+(G\times\text{exhaust oxygen}))/(1+(A\times\text{exhaust oxygen}))$.

Certain forms of the first method further comprise after a change in composition of the gaseous fuel: receiving with a controller sensor second inputs from the plurality of sensors; determining with the controller using the received second inputs a second SFAR value; determining with the controller directly from the second SFAR value without intermediate determinations a second lambda parameter G value; and controlling with the controller operation of the engine using the second lambda parameter G value; wherein the second lambda parameter G value is effective to adjust operation of the engine to the change in composition of the gaseous fuel.

Additional exemplary embodiments comprise systems including an electronic control system structured to perform a control process according to the first method or according to any of the foregoing forms of the first method. Additional exemplary embodiments comprise on-transitory controller-readable memory media configured with instructions executable by a controller to execute a control process according to the first method or according to any of the foregoing forms of the first method.

A further exemplary embodiment is a second method comprising: operating an internal combustion engine to combust a gaseous fuel; receiving with a controller input from one of a thermal conductivity sensor structured to sense thermal conductivity of the gaseous fuel and a speed of sound sensor structured to sense speed of sound in the gaseous fuel; receiving with the controller inputs from a first gaseous fuel mass flow sensor structured to sense mass flow of the gaseous fuel, and a second gaseous fuel mass flow sensor structured to sense mass flow of the gaseous fuel, the second gaseous fuel mass flow sensor being a different type of sensor than the first gaseous fuel mass flow sensor; determining with the controller using the inputs received from the first gaseous fuel mass flow sensor and the second gaseous fuel mass flow sensor a fused sensor ratio (FSR) value; determining with the controller a calculated value using the FSR value and the input received from the one of the thermal conductivity sensor and the speed of sound sensor; determining with the controller from the calculated value a gaseous fuel quality parameter value based on a predetermined relationship between the calculated value and gaseous fuel quality parameter; and controlling with the controller operation of the engine using the gaseous fuel quality parameter.

In certain forms of the second method the first gaseous fuel mass flow sensor comprises an orifice-type sensor and the second gaseous fuel mass flow sensor comprises a hot film sensor. In certain forms of the second method the calculated value is calculated as the product of a TC value based on the input received from the thermal conductivity sensor and the FSR value, and the gaseous fuel quality parameter is a methane number. In certain forms of the second method the calculated value is calculated as the product of an SOS value based on the input received from the speed of sound sensor and the FSR value, and the gaseous fuel quality parameter is a methane number. In certain forms of the second method the calculated value is calculated as the inverse of the product of a TC value based on the input received from the thermal conductivity sensor and the FSR value, and the gaseous fuel quality parameter is a gaseous fuel specific gravity. In certain forms of the second method the calculated value is calculated as the inverse of the product of an SOS value based on the input received from the speed of sound sensor and the FSR value, and the gaseous fuel quality parameter is a gaseous fuel specific gravity.

Certain forms of the second method further comprise after a change in composition of the gaseous fuel: determining with the controller using second inputs received from the first gaseous fuel mass flow sensor and the second gaseous fuel mass flow sensor a second FSR value; determining with the controller a second calculated value using the second FSR value and a second input received from the one of the thermal conductivity sensor and the speed of sound sensor; determining with the controller from the second calculated value a second gaseous fuel quality parameter; and controlling with the controller operation of the engine using the second gaseous fuel quality parameter; wherein the second gaseous fuel quality parameter is effective to adjust operation of the engine to the change in composition of the gaseous fuel.

Additional exemplary embodiments comprise systems including an electronic control system structured to perform a control process according to the second method or according to any of the foregoing forms of the second method. Additional exemplary embodiments comprise on-transitory controller-readable memory media configured with instructions executable by a controller to execute a control process according to the second method or according to any of the foregoing forms of the second method.

A further exemplary embodiment is a third method comprising: operating an internal combustion engine to combust a gaseous fuel; receiving with a controller input from one of a thermal conductivity sensor structured to sense thermal conductivity of the gaseous fuel and a speed of sound sensor structured to sense speed of sound in the gaseous fuel; receiving with the controller inputs from a gaseous fuel mass flow sensor, an intake fresh air mass flow sensor, and an exhaust $O_2$ sensor; determining with the controller using the received inputs from the gaseous fuel mass flow sensor, the intake fresh air mass flow sensor, and the exhaust $O_2$ sensor a stoichiometric fuel-to-air ratio (SFAR) value; determining with the controller a calculated value using the SFAR value and the input received from the one of the thermal conductivity sensor and the speed of sound sensor; determining with the controller from the calculated value a gaseous fuel quality parameter value based on a predetermined relationship between the calculated value and gaseous fuel quality parameter; and controlling with the controller operation of the engine using the gaseous fuel quality parameter.

In certain forms of the third method the gaseous fuel quality parameter value is a lower heating value. In certain forms of the third method the calculated value is calculated as the inverse of the product of a TC value based on the input received from the thermal conductivity sensor and the SFAR value. In certain forms of the third method the calculated value is calculated as the inverse of the product of an SOS value based on the input received from the speed of sound sensor and the SFAR value. In certain forms of the third method the calculated value is calculated as a TC value based on the input received from the thermal conductivity sensor divided by the SFAR value. In certain forms of the third method the calculated value is calculated as an SOS value based on the input received from the speed of sound sensor divided by the SFAR value.

Certain forms of the third method further comprise: after a change in composition of the gaseous fuel: receiving with a controller second inputs from the gaseous fuel mass flow sensor, the intake fresh air mass flow sensor, and the exhaust $O_2$ sensor; determining with the controller using the second received inputs a second SFAR value; determining with the controller a second calculated value using the second SFAR value and a second input received from the one of the thermal conductivity sensor and the speed of sound sensor; determining with the controller from the second calculated value a second gaseous fuel quality parameter value; and controlling with the controller operation of the engine using the second gaseous fuel quality parameter; wherein the second gaseous fuel quality parameter is effective to adjust operation of the engine to the change in composition of the gaseous fuel.

Additional exemplary embodiments comprise systems including an electronic control system structured to perform a control process according to the third method or according to any of the foregoing forms of the third method. Additional exemplary embodiments comprise on-transitory controller-readable memory media configured with instructions executable by a controller to execute a control process according to the third method or according to any of the foregoing forms of the third method.

A further exemplary embodiment is a fourth method comprising: operating an internal combustion engine to combust a gaseous fuel; receiving with a controller inputs from a plurality of sensors associated with the engine including inputs from a gaseous fuel mass flow sensor, an intake fresh air mass flow sensor, and an exhaust $O_2$ sensor; determining with the controller using the received inputs a stoichiometric fuel-to-air ratio (SFAR) value; determining with the controller directly from the SFAR value without intermediate determinations a Wobbe index value indicative of gaseous fuel quality based on a predetermined relationship between the SFAR value and the Wobbe index value; and controlling with the controller operation of the engine using the Wobbe index value.

Certain forms of the fourth method further comprise: receiving with a controller input from one of a thermal conductivity sensor structured to sense thermal conductivity of the gaseous fuel and a speed of sound sensor structured to sense speed of sound in the gaseous fuel; receiving with the controller inputs from the gaseous fuel mass flow sensor and a second gaseous fuel mass flow sensor structured to sense mass flow of the gaseous fuel, the second gaseous fuel mass flow sensor being a different type of sensor than the gaseous fuel mass flow sensor; determining with the controller using the inputs received from the gaseous fuel mass flow sensor and the second gaseous fuel mass flow sensor a fused sensor ratio (FSR) value; determining with the controller a calculated value using the FSR value and the input received from the one of the thermal conductivity sensor and the speed of sound sensor; determining with the controller from the calculated value a gaseous fuel quality parameter value based on a predetermined relationship between the calculated value and gaseous fuel quality parameter; and controlling with the controller operation of the engine using the gaseous fuel quality parameter.

Certain forms of the fourth method further comprise: receiving with a controller input from one of a thermal conductivity sensor structured to sense thermal conductivity of the gaseous fuel and a speed of sound sensor structured to sense speed of sound in the gaseous fuel in addition to the inputs from the gaseous fuel mass flow sensor, the intake fresh air mass flow sensor, and the exhaust $O_2$ sensor; determining with the controller a calculated value using the SFAR value and the input received from the one of the thermal conductivity sensor and the speed of sound sensor; determining with the controller from the calculated value a gaseous fuel quality parameter value based on a predetermined relationship between the calculated value and gaseous fuel quality parameter; and controlling with the controller operation of the engine using the gaseous fuel quality parameter.

Certain forms of the fourth method further comprise: after a change in composition of the gaseous fuel: receiving with a controller sensor second inputs from the plurality of sensors; determining with the controller using the received second inputs a second SFAR value; determining with the controller directly from the second SFAR value without intermediate determinations a second Wobbe index value; and controlling with the controller operation of the engine using the second Wobbe index value; wherein the second Wobbe index value is effective to adjust operation of the engine to the change in composition of the gaseous fuel.

Additional exemplary embodiments comprise systems including an electronic control system structured to perform a control process according to the fourth method or according to any of the foregoing forms of the fourth method. Additional exemplary embodiments comprise on-transitory controller-readable memory media configured with instructions executable by a controller to execute a control process according to the fourth method or according to any of the foregoing forms of the first method.

As is evident from the figures and text presented above, a variety of aspects of the present invention are contemplated. According to one aspect, a method includes introducing natural gas into an intake system of an internal combustion engine; operating the internal combustion engine in response at least partially to the introducing of the natural gas into the intake system of the internal combustion engine; sensing at least one engine parameter associated with the operating of the internal combustion engine; measuring at least one property of the natural gas in response to the sensing of the at least one engine parameter; and estimating at least one quality parameter of the natural gas in response to the measuring of the at least one gas property.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating an internal combustion engine to combust a gaseous fuel;
   receiving with a controller inputs from a plurality of sensors associated with the engine including inputs from a gaseous fuel mass flow sensor, an intake fresh air mass flow sensor, and an exhaust $O_2$ sensor;

determining with the controller using the received inputs a stoichiometric fuel-to-air ratio (SFAR) value by processing the received inputs;

determining with the controller directly from the SFAR value without intermediate determinations a new value for a lambda parameter G indicative of gaseous fuel quality based on a predetermined relationship between the SFAR value and the lambda parameter G; and controlling with the controller operation of the engine using the new value for the lambda parameter G.

2. The method of claim 1 wherein the act of controlling with the controller operation of the engine using the lambda parameter G value comprises calculating a lambda control value ($\lambda$) using the lambda parameter G value and controlling operation of the engine using the lambda control value ($\lambda$).

3. The method of claim 2 wherein the act of calculating the lambda control value ($\lambda$) comprises calculating a lambda parameter A based upon a ratio of $N_2$ to $O_2$ in the intake charge provided to the engine and a ratio $H_2O$ to $O_2$ in the intake charge provided to the engine of and calculating the lambda control value using the lambda parameter A.

4. The method of claim 3 wherein the lambda parameter A is calculated in accordance with the equation: $A=1+(N_2/O_2)+(H_2O/O_2)$, and the lambda control value ($\lambda$) is determined in accordance with the equation: $\lambda=(1+(G\times\text{exhaust oxygen}))/(1+(A\times\text{exhaust oxygen}))$.

5. The method of claim 1 wherein the act of processing the received inputs comprises performing a calculation in accordance with the equation: (SFAR mass flow sensor input/fresh air mass flow sensor input)*(exhaust $O_2$ or lambda sensor input).

6. A system comprising:
an internal combustion engine to combust a gaseous fuel of unspecified composition;
a controller configured to:
receive inputs from a gaseous fuel mass flow sensor, an intake fresh air mass flow sensor, and an exhaust $O_2$ sensor,
compute a stoichiometric fuel-to-air ratio (SFAR) value in response to the received inputs;
determine a new value of a lambda parameter G indicative of gaseous fuel quality or composition based on a predetermined relationship between the SFAR value and the lambda parameter G; and
control operation of the engine using the new value of the lambda parameter.

7. The system of claim 6 wherein the controller is configured to calculate the lambda value ($\lambda$) using the lambda parameter G value and controlling operation of the engine using the lambda control value ($\lambda$).

8. The system of claim 7 wherein the controller is configured to calculate a lambda parameter A based upon a ratio of $N_2$ to $O_2$ in the intake charge provided to the engine and a ratio $H_2O$ to $O_2$ in the intake charge provided to the engine of and calculating the lambda control value using the lambda parameter A.

9. The system of claim 8 wherein the controller is configured to calculate the lambda parameter A in accordance with the equation: $A=1+(N_2/O_2)+(H_2O/O_2)$, and to determine the lambda control value ($\lambda$) is in accordance with the equation: $\lambda=(1+(G\times\text{exhaust oxygen}))/(1+(A\times\text{exhaust oxygen}))$.

10. An apparatus comprising:
a non-transitory controller readable memory medium structure to store instructions executable by controller to perform the acts of
processing inputs from a gaseous fuel mass flow sensor, an intake fresh air mass flow sensor, and an exhaust $O_2$ sensor to determine a stoichiometric fuel-to-air ratio (SFAR) value;
determining from the SFAR value a new value for a lambda parameter G indicative of gaseous fuel composition based on a predetermined relationship between the SFAR value and the lambda parameter G; and
controlling operation of an engine to combust gaseous fuel using the new value.

11. The apparatus of claim 10 wherein the act of controlling with the controller operation of the engine using the lambda parameter G value comprises calculating a lambda control value ($\lambda$) using the lambda parameter G value and controlling operation of the engine using the lambda control value ($\lambda$).

12. The apparatus of claim 11 wherein the act of calculating the lambda control value ($\lambda$) comprises calculating a lambda parameter A based upon a ratio of $N_2$ to $O_2$ in the intake charge provided to the engine and a ratio $H_2O$ to $O_2$ in the intake charge provided to the engine of and calculating the lambda control value using the lambda parameter A.

13. The apparatus of claim 12 wherein the lambda parameter A is calculated in accordance with the equation: $A=1+(N_2/O_2)+(H_2O/O_2)$, and the lambda control value ($\lambda$) is determined in accordance with the equation: $\lambda=(1+(G\times\text{exhaust oxygen}))/(1+(A\times\text{exhaust oxygen}))$.

14. The system of claim 10 wherein the controller is configured to calculate the lambda value ($\lambda$) using the lambda parameter G value and controlling operation of the engine using the lambda control value ($\lambda$).

* * * * *